United States Patent
Fischer et al.

(10) Patent No.: US 6,375,920 B2
(45) Date of Patent: Apr. 23, 2002

(54) PROCESS FOR THE MANUFACTURE OF HYDROGEN PEROXIDE

(75) Inventors: Martin Fischer, Ludwigshafen; Gerd Kaibel, Lampertheim; Achim Stammer, Freinsheim; Klemens Flick, Herxheim; Stefan Quaiser, Limburgerhof; Wolfgang Harder, Weinheim; Klemens Massonne, Westheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/284,247

(22) PCT Filed: Oct. 15, 1997

(86) PCT No.: PCT/EP97/05659

§ 371 Date: Apr. 15, 1999

§ 102(e) Date: Apr. 15, 1999

(87) PCT Pub. No.: WO98/16463

PCT Pub. Date: Apr. 23, 1998

(30) Foreign Application Priority Data

Oct. 16, 1996 (DE) .......................... 196 42 770

(51) Int. Cl.$^7$ .............................................. C01B 15/01
(52) U.S. Cl. ...................................................... 423/584
(58) Field of Search ......................................... 423/584

(56) References Cited

U.S. PATENT DOCUMENTS

| | | |
|---|---|---|
| 3,873,469 A | 3/1975 | Foster et al. |
| 4,009,252 A | 2/1977 | Izumi et al. |
| 4,151,914 A | 5/1979 | Blatt |
| 4,333,896 A | 6/1982 | Cunningham |
| 4,335,092 A * | 6/1982 | Dalton, Jr. et al. ......... 423/584 |
| 4,336,238 A | 6/1982 | Dalton, Jr. et al. |
| 4,336,239 A * | 6/1982 | Dalton, Jr. et al. ......... 423/584 |
| 4,364,888 A | 12/1982 | Levin |
| 4,389,390 A | 6/1983 | Dalton, Jr. et al. |
| 4,450,244 A | 5/1984 | Domesle et al. |
| 4,471,014 A | 9/1984 | Hartog et al. |

(List continued on next page.)

FOREIGN PATENT DOCUMENTS

| | | |
|---|---|---|
| DE | 4 113 525 | 10/1992 |
| GB | 1 414 133 | 11/1975 |
| WO | WO 92/04277 | 3/1992 |
| WO | WO 92/04976 | 4/1992 |
| WO | WO 96/05138 | 2/1996 |

OTHER PUBLICATIONS

John R. Kosak, "A Novel Fixed Bed Catalyst for the Direct Combination of $H_2$ and $O_2$ to $H_2O_2$", Catalysis of Organic Reactions, (eds. Scaros and Prunier), Marcel Dekker Inc., New York, 1995 pp. 115–124, (No month).

Römpp Chemie Lexikon, 9$^{th}$ Edition, pp. 1453–1454, (With English Abstract), (No date).

M.T. Reetz, et al., Agnew. Chem. Int. Ed. Engl., vol. 34, No. 23/24, pp. 2728–2730, "A New Strategy in Heterogeneous Catalysis: The Design of Cortex Catalysts", 1995, (No month).

P. Fauchais, et al., Pure and Appl. Chem., vol. 66, No. 6, pp. 1247–1258, "Plasma Spraying: Present and Future", 1994, (No month).

Primary Examiner—Wayne Langel
(74) Attorney, Agent, or Firm—Oblon, Spivak, McClelland, Maier & Neustadt, P.C.

(57) ABSTRACT

A process for preparing a hydrogen peroxide solution having a hydrogen peroxide content of not less than 2.5% by weight, which comprises continuously reacting hydrogen and oxygen in an aqueous, alcoholic or aqueous/alcoholic reaction medium in the presence of a catalyst containing palladium.

15 Claims, 1 Drawing Sheet

U.S. PATENT DOCUMENTS

| | | |
|---|---|---|
| 4,686,202 A | 8/1987 | Broecker |
| 4,731,229 A | 3/1988 | Sperandio |
| 4,832,938 A | 5/1989 | Gosser et al. |
| 4,889,705 A * | 12/1989 | Gosser .................. 423/584 |
| 5,030,742 A | 7/1991 | Tieke |
| 5,236,692 A | 8/1993 | Nagashima et al. |
| 5,265,074 A | 11/1993 | Ohta et al. |
| 5,275,790 A | 1/1994 | Buchholz et al. |
| 5,292,496 A | 3/1994 | Nagashima et al. |
| 5,320,821 A | 6/1994 | Nagashima et al. |
| 5,352,645 A | 10/1994 | Schwartz |
| 5,399,334 A | 3/1995 | Kawakami et al. |
| 5,480,629 A | 1/1996 | Thompson et al. |
| 5,500,202 A | 3/1996 | Germain et al. |
| 5,525,570 A | 6/1996 | Chakraborty et al. |
| 5,643,850 A | 7/1997 | Chakraborty et al. |
| 5,825,047 A | 10/1998 | Ajisawa et al. |

* cited by examiner

FIGURE 1

PROCESS FOR THE MANUFACTURE OF HYDROGEN PEROXIDE

DESCRIPTION

The present invention relates to a process for preparing a hydrogen peroxide solution having a hydrogen peroxide content of not less than 2.5% by weight by continuous reaction of hydrogen and oxygen over a catalyst comprising palladium as active component.

Customary industrial processes for preparing hydrogen peroxide are the electrolysis of acidic ammonium sulfate solutions, the oxidation of isopropyl alcohol and the anthraquinone process. The direct synthesis of hydrogen peroxide from the elements over transition metal catalysts is known, but has not found commercial use to date.

There are several reasons for this. For instance, hydrogen and oxygen form explosive gas mixtures if the level of hydrogen in the gas mixture is above 5% by volume. On the other hand, the rate of formation of hydrogen peroxide on using hydrogen-oxygen mixtures outside the explosive range is generally too low to ensure reasonable space-time yields. In addition, an excessively high level of oxygen in the reaction gas can speed up the oxidative degradation of the catalysts.

The selectivity of the reaction is a further problem. For instance, the reaction to form the hydrogen peroxide has to compete with that to form water. In addition, the catalysts which are suitable for forming hydrogen peroxide from the elements also catalyze the degradation reaction of hydrogen peroxide in the presence of excess hydrogen in accordance with the following reaction equation: $H_2O_2+H_2 \rightarrow 2H_2O$. This selectivity problem can be solved by using continuous processes at high flow rates. However, this has the consequence that, at a low reaction rate, the hydrogen peroxide concentrations obtained in the effluent become too low for commercial use of this process. In addition, excessively high flow rates give rise to catalyst abrasion problems, leading to reduced on-stream times and hence likewise to commercial disadvantages for this process.

U.S. Pat. No. 4,009,252 discloses an optimum ratio of $O_2$ to $H_2$ within the range from 1.5:1 to 20:1, i.e. in the explosive range, for the formation of hydrogen peroxide from hydrogen and oxygen over palladium catalysts. The reaction is carried out as a batch process and the space-time yields which are obtained are unsatisfactory.

WO 92/04277 describes the reaction of hydrogen with oxygen in a tubular reactor packed with an aqueous suspension of catalyst. The gas mixtures used are preferably located within the explosive range. A high flow rate of the reaction medium (>1 m/sec) is used to ensure that the reaction gas is completely dispersed in the reaction medium in the form of small bubbles, preventing an explosive reaction of the reaction gas. The hydrogen peroxide concentrations obtained after a single pass through the reaction zone are below 1% by weight. Higher yields can only be obtained by repeated passes through the reaction zone. The fact that the catalyst is used in the form of a suspension turns out to be a problem because this necessitates elaborate filtration and recycling measures, with inevitable losses of the catalyst. Reaction tubes which are suitable for the required reaction pressure—pressures of above 80 bar are disclosed in the illustrative embodiments—are comparatively costly. The cited process must therefore be considered very costly. A similar process with improved fluidization of the hydrogen and oxygen streams is described in WO 96/05138.

U.S. Pat. No. 5,500,202 and EP-A 579 109 describe a continuous process for preparing hydrogen peroxide by reacting $H_2/O_2$ gas mixtures over a stationary pulverulent catalyst (particle sizes within the range 10 μm to 250 μm) in a trickle bed reactor. To reduce the risk of explosion due to the large gas volume which is customary for a trickle bed reactor, nitrogen is added as an inert gas to the reaction gas. However, this entails additional costs. The aqueous hydrogen peroxide solutions obtained in this way only have concentrations within the range from 3 to 5%. The conversion based on hydrogen is merely within the range of 25-35%. No data are provided about catalyst life. Reactors having a maximum internal diameter of 30 mm are recommended because of the considerable heat production. Industrial use would therefore require the installation of several thousands of these tubular reactors, which entails high capital expenditure costs.

U.S. Pat. No. 4,336,238 and U.S. Pat. No. 4,336,239 describe the reaction of hydrogen and oxygen to form hydrogen peroxide over palladium catalysts in organic solvents or solvent mixtures in the presence or absence of water. The process described makes it possible to reduce the proportion of hydrogen in the reaction gas, but the hydrogen peroxide concentrations of more than 2.4% by weight which are obtained on using reaction gas mixtures comprising less than 5% by volume of hydrogen are too low for commercial application. The use of organic solvents has an advantageous effect on catalyst life. However, over a run of 285 hours catalyst activity decreases to 69% of the original value, which is still too low for industrial application. U.S. Pat. No. 4,389,390 describes a similar process in which the catalyst which has become detached from the support is recovered by activated carbon filters. A further advantage of this process is that removal of the catalyst from the reaction medium reduces the tendency of the hydrogen peroxide to decompose. However, no hydrogen hydrogen peroxide solutions having a concentration of above 2.1% by weight are obtained in continuous operation.

The literature proposes various solutions for the problem of catalyst deactivation in the preparation of hydrogen peroxide from the elements. For instance, U.S. Pat. No. 5,352,645 and WO 92/04976 describe special solid supports composed of spray-dried, colloidal silica gel. The use of superacidic oxides as support materials is proposed in U.S. Pat. No. 5,236,692 and EP-A 437 836. This avoids the customary acid content in the reaction medium. EP-A 627 381 teaches the use of niobium, tantalum, molybdenum or tungsten oxides as support materials which are characterized by high acid resistance. U.S. Pat. No. 5,292,496 describes the use of cerium-comprising support materials to avoid the use of halogen as a stabilizer in the reaction medium. However, in the references cited, hydrogen peroxide is always prepared by batch or semicontinuous processes which have little to recommend them for industrial use. In addition, the short reaction times do not provide any information about catalyst life.

The use of catalyst monoliths comprising palladium as active component is described by Kosak in Catalysis of Organic Reactions (eds. Scaros and Prunier), Marcel Dekker Inc., New York 1995, p. 115 et seq., for the preparation of hydrogen peroxide from the elements. The reaction is carried out batchwise in an aqueous reaction medium at a comparatively high pressure of 144 bar and a molar ratio of $O_2:H_2=4.7$, i.e. in the explosive range.

It is an object of the present invention to provide a process for preparing hydrogen peroxide from hydrogen and oxygen to prepare hydrogen peroxide solutions having a hydrogen peroxide content of above 2.5% by weight even from hydrogen-oxygen mixtures outside the explosive range ($O_2:H_2>20:1$). The catalysts used shall have long on-stream times.

We have found that this object is achieved by a continuous process comprising the reaction of hydrogen and oxygen in water and/or $C_1$-$C_3$-alkanols as reaction medium over catalytic structures comprising palladium as active component.

The present invention accordingly provides a process for preparing a hydrogen peroxide solution having a hydrogen peroxide content of not less than 2.5% by weight by continuous reaction of hydrogen and oxygen over a catalyst comprising palladium as active component, which comprises performing the reaction in water and/or a $C_1$-$C_3$-alkanol as reaction medium over a catalytic structure.

Catalytic structures are catalysts in which the catalytically active component is situated on the surface of specifically shaped supports. Such supports can be customary packing elements, such as Raschig rings, saddles, Pall® rings, wire spirals or wire mesh rings, constructed from various materials suitable for coating with the active component (see also Römpp-Chemie-Lexikon, 9th edition, p. 1453 et seq.). The packing elements provided with the catalytically active component are dumped into the reactor. Preferred structures have channels with hydraulic radii (definition see VDI-Wärmeatlas, section LE1) within the range from 1 to 10 mm.

Preference is given to catalytic structures which are installed in the reactor in the form of arranged packings and which have a large surface area relative to the volume due to a multiplicity of flow-through channels. Such structures will hereinafter be referred to as catalyst monoliths. Suitable reactors are described for example in EP-A 068 862, EP-A 201 614 and EP-A 448 884.

The catalyst monoliths or, to be more precise, the monolithic supports are generally constructed from wovens, knits, foils, expanded metals and/or sheets. Monolithic supports can also be prepared by extrusion as described in U.S. Pat. No. 4,364,888 and U.S. Pat. No. 4,333,896. Suitable monolithic supports include structures constructed from open-celled foams. These foams can be for example ceramic, melamine resin or polyurethane foams.

Preference is given to catalyst monoliths constructed from wovens, since they are particularly well permeated by the liquid reaction medium in the reactor and thus permit high conversion rates.

Suitable wovens are constructed for example from fibers of oxidic materials, such as $Al_2O_3$ and/or $SiO_2$, or from polymeric fibers, for example polyamide, polyester, polyvinyl chloride, polyethylene, polypropylene, polytetrafluoroethylene fibers, or carbon fibers. Preference is given to woven catalyst supports constructed from weavable metal wires, for example composed of iron, spring steel, hastelloy, monel, silver, chrome steel, chrome nickel steel or titanium. Very particular preference is given to woven catalyst supports constructed from weavable wires of highly alloyed stainless steels or metals which protect against further corrosion through formation of a passivating layer, for example Cr steels, CrNi steels, CrNiTi steels and CrNiMo steels or heat-resistant steels having the material numbers 1.4016, 1.4767, 1,4401, 2.4610, 1.4765, 1.4847, 1.4301, 1.4742.

The wires and fibers mentioned can be used to produce wovens in different constructions, such as flat constructions, twill constructions, galloon constructions, five-shaft satin constructions and other specialty constructions. These wovens are preferably joined together to form multilayered assemblies. Suitable woven monolithic catalyst supports are described in EP-A 498 435.

Particularly suitable catalyst monoliths are constructed from a plurality of layers of corrugated, folded and/or flat wovens arranged in such a way that adjacent layers form more or less closed channels. The hydraulic diameter of the channels is preferably within the range from 1 to 10 mm, in particular from 1.5 to 3 mm (as per definition in VDI-Warmeatlas, section LE1). These channels can be straight or curved. Preference is given to multilayered wovens in which flat and corrugated or folded wovens alternate. Monoliths in which the wovens are partly or wholly replaced by metal sheets, knits or expanded metals, can likewise be used. Such monoliths are preferably installed in the reactor in such a way that the channels are inclined away from the flow direction of the reaction medium. The woven layers themselves are preferably installed in the reactor parallel to the direction of flow. If a plurality of these units are to be arranged in series, they are preferably installed in such a way that the flow channels are alternatingly inclined in opposite directions away from the flow direction. The units are preferably installed in such a way that the woven layers of two successive units form an angle of preferably about 90° to each other. Wound moduli of corrugated or folded and optionally also planar woven layers are likewise suitable.

The coating of the catalyst supports with the catalytically active component is effected according to customary coating methods (see below). In the case of monolithic supports constructed from wovens, foils, sheets, knits or expanded metals, coating generaly takes place prior to further processing to the catalyst monolith. However, it can also take place on the preformed support. If the wovens are to be clamped in use frames and then optionally joined together to form catalyst cells, it is advisable to coat the wovens in the unprocessed state.

The catalytically active component, as well as palladium as main substituent, may comprise further metals, preferably noble metals especially platinum, rhodium, iridium, copper, silver and/or gold as promoters. The ratio of palladium/promoter metal is preferably within the range from 100:1 to 1:10 and in particular within the range from 10:1 to 1:1. The palladium and the optional promoter metals generally account for from $5\times10^{-4}$ to 1% by weight and in particular from $10^{-3}$ to 0.15% by weight, based on the total catalyst mass (support+active component).

In the case of catalyst supports having a porous surface, as is the case, for example, with catalyst supports having surfaces of active aluminum oxide or $SiO_2$, the active component is generally applied by an impregnating or saturating step, which is generally followed by a drying and activating step. Such techniques are described for example-in DE-A 22 56 195 or in DE-A 23 17 560, incorporated herein in full by reference. Also suitable are catalysts in which an active aluminum oxide layer and then a coating of palladium is applied to a metal support. The oxide layer is prepared by dipping the support into a dispersion of active aluminum oxide and then heat-treating at elevated temperature. The noble metal is then applied on top of this oxide layer by saturating with a palladium salt solution, and activated after drying by reduction with hydrogen at 500° C. This process is disclosed in EP-A 075 124, likewise incorporated herein in full by reference. DE-A 41 13 525 describes a process for coating surfaces in complex geometrical structures with noble metals by, in a first step, wetting the structures with a solution comprising the complexes of the metals with organic ligands and then destroying these complexes by UV irradiation. In this way it is possible to provide nets, webs, fibers and bodies having a honeycomb, spongey or porous structure with stable noble metal coatings, irrespectively of the chemical constitution of the surface. This coating process is likewise suitable for preparing the catalyst monoliths of the invention. Coatings suitable for the purposes of the invention can be obtained in the manner described in EP-A 374 099 by saturating the catalyst support with suitable palladium(0) complexes and subsequent thermolysis of these complexes. Reetz et al. (Angew. Chem. 1995, 107, 2956-2958) describe the coating of $SiO_2$ or $Al_2O_3$ surfaces with preformed palladium clusters. This produces, even in the case of porous surfaces, very thin layers of the active component (eggshell catalysts). This method too can be used to prepare catalyst monoliths suitable for the purposes of the present invention. The application of metals upon thermally stable catalyst supports can also be effected by the process of flame-spraying (see P. Fauchais et al. in Pure and Appl. Chem., Vol. 66, (1994), 1247-1258). The catalytically active component can also be applied by vacuum vapor deposition of metals upon the catalyst support. Suitable vacuum vapor deposition techniques include in particular therml vapor deposition, flash vapor deposition, cathode atomization and also sputtering. Thermal vapor deposition can be carried out by direct or indirect electrical heating. Electron beam vapor deposition is preferably employed for this method. The woven catalyst supports of the invention can be coated continuously or batchwise according to these processes. Reference is made to EP-A 198 435 for further details. The process described in DE-A 41 21 418 for applying Pd or Pt alloys to metal surfaces is likewise suitable for preparing the catalysts of the invention.

Palladium and optionally the promoters are preferably applied to the catalyst support by electrolytic, especially by electrochemical, deposition from corresponding metal salt solutions. Suitable reducing agents are in particular hydrazine, citric acid, ethanol, salts of hypophosphorous acid, e.g. $NaH_2PO_2$, formaldehyde, formic acid, boranates such as sodium borohydride, or stabilized borane solutions such as, for example, complexes of borane with diethyl ether, dimethylamine or diethylamine (see also A. Laus in Mater. Sci. Eng. A 146 (1991) 33, 49; see also Dechema-Tagungsbericht XXIX. Jahrestreffen deutscher Katalytiker, Friedrichroda, März 1996, p. 66).

Here it is advisable to pretreat the catalyst support to improve the adhesion of the active component to the support's surface. This includes for example removing greases or similar substances which impair the desired surface adhesion, for example by rinsing with organic solvents such as ether, acetone or halogenated hydrocarbons, or calcining. Oxide layers on metallic supports can also be removed by treatment with mineral acids, for example hydrochloric acid or sulfuric acid. The resulting graining of the metallic surface improves the cementing of the active component, especially in the case of electrolytic or electrochemical deposition.

The catalyst systems of support and active component/promoter resulting from the processes described can then be activated by thermal treatment at from 200 to 900° C., preferably 400 to 700° C. This thermal after treatment can take place in an oxidizing, inert or reducing atmosphere. Especially in the case of polymetallic systems, activation in a reducing atmosphere is preferred, since alloys are formed more readily.

The finished catalyst systems are then fitted in the reaction space (see above). Particular preference is given to tubular reactors equipped with cylindrical catalyst units, since a uniform flow regime is able to form here, which allows particularly good reaction control.

The reaction is generally carried out with a flooded reactor. The reaction medium used is water and/or $C_1$-$C_3$-alkanols, preferably water and/or methanol. If the reaction medium used is water, up to 20% by weight of the alcohol, preferably methanol, can be added to it. If an alcoholic reaction medium is used, it can include up to 40% by weight, preferably up to 20% by weight, particularly preferably up to 5% by weight, of water. Very particular preference is given to water as sole reaction medium. To stabilize the hydrogen peroxide against decomposition, the reaction medium is admixed with acids whose pKa value is preferably less than that of acetic acid, especially mineral acids such as sulfuric acid, phosphoric acid or hydrochloric acid. The acid concentration is generally not less than $10^{-4}$ mol/liter, preferably within the range from $10^{-3}$ to $10^{-1}$ mol/liter. In addition, in general, traces of bromide or chloride are added in concentrations of from 1 to 1000 ppm, preferably 5 to 300 ppm. However, it is also possible to use other stabilizers, for example formaldehyde.

The reaction gas, which, as well as hydrogen and oxygen, may further comprise inert gases such as nitrogen or noble gases, generally has $O_2$:$H_2$ ratios within the range from 2:1 to 1000:1. Preference is given to molar ratios within the range 5:1 to 100:1, particularly preferably within the range from 20:1 to 50:1. The oxygen used in the reaction gas can also be included in the reaction gas in the form of air.

In a preferred embodiment, the reaction gas is recycled. In this case, the molar ratio in the fresh gas mixture is in the vicinity of the stoichiometry of the reaction, preferably within the range from 1.5:1 to 0.5:1. The molar ratio of $O_2$:$H_2$ in the recycle gas should be within the range from 5:1 to 1000:1, preferably within the range from 20:1 to 100:1. The reaction can be carried out at atmospheric pressure and also at superatmospheric pressures of up to 200 bar. The pressure is preferably within the range from 10 to 100 bar, especially within the range from 10 to 80 bar. The reaction temperature can be within the range from 0 to 60° C., preferably within the range from 20 to 50° C. The partial pressures of the reaction gases in the reaction gas mixture in the reactor and also in the recycle gas are preferably chosen so that, under reaction conditions, the hydrogen concentration is below the lower explosion limit.

Reaction gas and reaction medium can move cocurrently or countercurrently to each other, preferably cocurrently, in which case the liquid phase forms the continuous phase and the reaction gas the discontinuous phase. In the case of the preferred vertical reactor design (upright reactor), reaction gas and reaction medium are preferably passed in cocurrent upwardly through the reactor. Here, hydrogen can be fed into the reactor via one or more intermediate feed points downstream of the feed point for the oxygen or air feed point. The superficial velocity of reaction gas and reaction medium is within the range from 50 to 1000 m/h, preferably within the range from 150 to 300 m/h.

The disclosed process makes it possible to produce hydrogen peroxide solutions having hydrogen peroxide contents above 2.5% by weight, preferably within the range from 5 to 25% by weight. The concentration can be preselected as desired by adjusting the mass flows. The selectivity of hydrogen peroxide formation is always above 65%, preferably 75%. Long-term studies have shown that catalyst activity and selectivity decrease little, if at all, in the course of a 40-day run.

Figure 1:
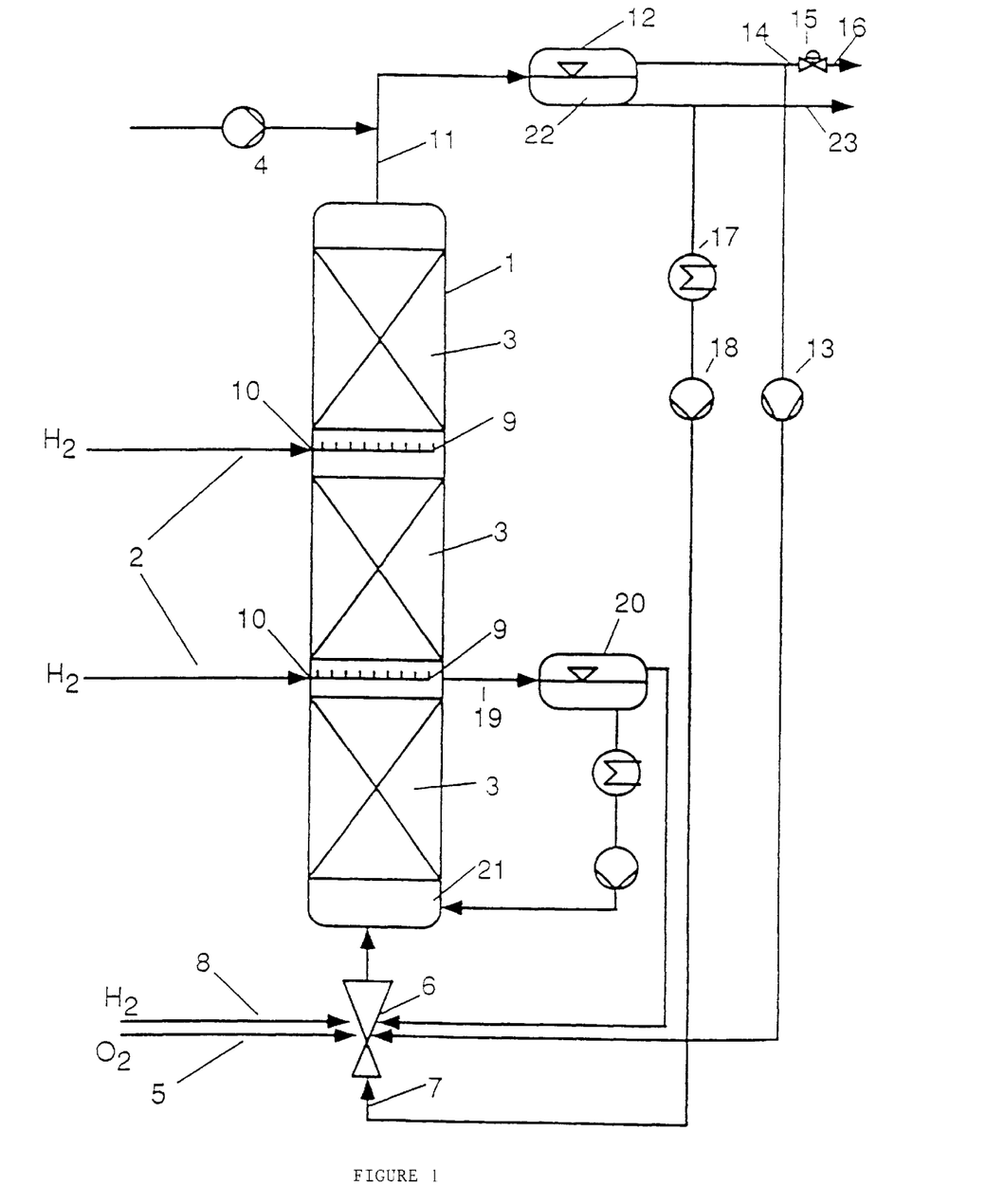

FIG. 1 shows by way of example a reactor system featuring an upright reactor 1, which has hydrogen feed points 2 arranged intermediate of a plurality of layers 3 of woven catalyst monolith. A pump 4 supplies methanol and/or water. A connection line 5 supplies oxygen and a gas-liquid disperser, for example a mixing jet 6, disperses it in the form of bubbles in a circulating liquid 7. The same mixing jet 6—or a separate mixing jet, if desired—supplies a stream 8 of hydrogen. Further quantities 2 of hydrogen are supplied under quantity control via dispersing means 9 at the intermediate feed points 10 between the catalyst layers 3. At the upper end of the reactor, a two-phase reactor effluent 11 is removed and separated in a separating vessel 12. The gas phase is reintroduced at the lower end of the reactor via the mixing jet 6 after passing through a compressor 13 or, if the reactor is not very tall, preferably directly. A stream 14 of the gas is fed via a pressure container 15 into the off-gas line 16 to limit the build-up of inerts. The liquid is cooled with cooling water in a heat exchanger 17 and reintroduced via a pump 18, at the lower end of the reactor. In addition, it is also possible to provide intermediate removal points 19 for the two-phase reactor contents along the reactor, to carry out a phase separation 20 and to reintroduce the two phases—the liquid phase cooled—at a lower point 21 of the reactor. The liquid reaction product 22 is removed from the phase separator 12 at the upper end of the reactor as stream 23.

The Examples which follow illustrate the present invention.

I. Preparation of catalyst shapes using supports composed of V4A fabric

A corrugated net and a flat net composed of V4A steel (1.4571, mesh size 180 µm, wire diameter 146 µm) were placed on top of each other and rolled to form a cylindrical monolith 5 cm in height and 5 cm in diameter. The ends of the nets were fixed by spot welding. The net plane spacing of the flat nets was not less than 1 mm.

The monolithic support was treated in succession with acetone and distilled water and then dried. Thereafter the monolith was treated with a solution of 25% by weight of concentrated hydrochloric acid and 75% by weight of distilled water at 60° C. for 30 minutes and rinsed off with distilled water. The monolith thus treated was introduced into 150 ml of distilled water. After the addition of 10 drops of concentrated $HNO_3$ and 36 ml of a 1% strength by weight aqueous solution of hypophosphorous acid, 20 ml of a palladium nitrate solution having a palladium concentration of 1% by weight were added. This was followed by heating to 60° C. for 17 minutes and then to 80° C. for one hour. This was followed by cooling, and the catalyst monolith was washed with distilled water and dried at 120° C. for 16 hours.

II. Preparation of hydrogen peroxide

The reaction vessel used is a 270 ml autoclave equipped with stirrer, thermostating and 50 bar pressure maintenance. In this autoclave, the catalyst monolith prepared in I was installed centrally around the stirrer axis, so that it is uniformly supplied with liquid and gas by the stirrer. The reactor bottom is equipped with feed lines for oxygen, hydrogen and the reaction medium. The reactor lid is equipped with a take-off line from which the product/gas mixture is continuously removed. After deduction of the volumes for all internals, the effective reaction volume available was 208 ml.

EXAMPLE 1

The reaction medium consisted of methanol admixed with 0.4% by weight of sulfuric acid, 0.1% by weight of phosphoric acid and 6 ppm of bromide (in the form of sodium bromide). The reactor was flooded with the reaction medium. A stream of 72.8 g/h of reaction medium, 48.6 l/h of oxygen and 5.5 l/h of hydrogen (gases based on standard conditions) was then passed through the reactor. The product/gas mixture was continuously removed at the reactor lid.

The conversion based on hydrogen was 76% (as per determination of the hydrogen content of the off-gas) coupled with a selectivity of 82%. The concentration of the resulting methanolic hydrogen peroxide solution was 7% by weight (titration with 0.1 N $KMnO_4$).

EXAMPLE 2

Example 1 was run for 100 hours. In total, 2.9 kg of hydrogen peroxide were obtained in the form of a methanolic solution having a concentration of 4% by weight.

EXAMPLE 3

A catalyst monolith was prepared from V4A net with a palladium coating similarly to I. This shape was then hydrogenated with hydrogen at 70° C. and 50 bar, treated with methanolic $H_2O_2$ solution at 20° C. and dried with nitrogen. The catalyst shape was then installed in the autoclave of II. The reaction was carried out similarly to Example 1: The flow rate through the reactor at 42.2° C. was 214.5 g/h for the reaction medium, 145.8 l/h for oxygen and 16.2 l/h for hydrogen. The conversion based on $H_2$ was 84% coupled with a selectivity of 75%. The concentration of the methanolic hydrogen peroxide solution was 7% by weight.

EXAMPLE 4

The same catalyst as in Example 3 was used. The reaction parameters were as follows: 214.5 g/h of reaction medium, 145.8 l/h of oxygen, 6.1 l of hydrogen, T=52° C. The conversion based on $H_2$ was 90%, coupled with a selectivity of 68%. The concentration of the resulting hydrogen peroxide solution was 2.7% by weight.

EXAMPLE 5

The same catalyst as in Example 3 was used. The reaction medium was water admixed with 0.4% by weight of sulfuric acid, 0.1% by weight of phosphoric acid and 6 ppm of bromide (in the form of sodium bromide). The reaction parameters were as follows: 268.0 g/h of reaction medium, 291.6 l/h of oxygen, 32.4 l/h of hydrogen, T=42° C. The conversion based on hydrogen was obtained by determining the hydrogen in the off-gas and was found to be 43% coupled with a selectivity of 70%. The concentration of the resulting hydrogen peroxide solution was 5.6% by weight.

We claim:

1. A process for preparing a hydrogen peroxide solution having a hydrogen peroxide content of not less than 2.5% by weight by continuous reaction of hydrogen and oxygen over a catalyst comprising palladium as active component, which comprises performing the reaction in water and/or a $C_1$-$C_3$-alkanol as reaction medium over a catalytic structure.

2. A process as claimed in claim 1, wherein the catalytic structure is an ordered catalytic packing (monolith).

3. A process as claimed in claim 1 or 2, wherein the catalytic structure is constructed from a woven.

4. A process as claimed in claim 3, wherein the woven is a metallic woven.

5. A process as claimed in any of the preceding claims, wherein the active component includes not only palladium but also a further noble metal as promoter.

6. A process as claimed in claim 5, wherein the molar ratio of palladium to promoter metal is within the range from 100:1 to 1:10.

7. A process as claimed in claim 5 or 6, wherein the promoter is selected from platinum, rhodium, iridium, copper, silver and gold.

8. A process as claimed in any of the preceding claims, wherein the oxygen is used in the form of air.

9. A process as claimed in any of the preceding claims, wherein the molar ratio of $O_2:H_2$ in the off-gas is above 20:1.

10. A process as claimed in any of claims 1 to 8, wherein the reaction gas is recycled.

11. A process as claimed in claim 10, wherein the molar ratio of $O_2:H_2$ in the recycle gas is within the range from 20:1 to 50:1.

12. A process as claimed in any of the preceding claims, wherein the reaction is carried out at a temperature within the range from 0° C. to 80° C.

13. A process as claimed in any of the preceding claims, wherein the reaction is carried out at a pressure within the range from 10 to 100 bar.

14. A process as claimed in any of the preceding claims, wherein the reaction medium comprises water, methanol or a methanol-water mixture.

15. A process as claimed in any of the preceding claims, wherein the reaction medium further comprises an acid having a pKa below that of acetic acid.

* * * * *

UNITED STATES PATENT AND TRADEMARK OFFICE
CERTIFICATE OF CORRECTION

PATENT NO. : 6,375,920 B2
DATED : April 23, 2002
INVENTOR(S) : Fischer et al.

It is certified that error appears in the above-identified patent and that said Letters Patent is hereby corrected as shown below:

<u>Title page,</u>
Add Items [45] and Notice as follows:

-- [45] **Date of Patent: \*Apr. 23, 2002**

[\*] Notice: This patent issued on a continued prosecution application filed under 37 CFR 1.53(d), and is subject to the twenty year patent term provisions of 35 U.S.C 154(a)(2).

Subject to any disclaimer, the term of this patent is extended or adjusted under 35 U.S.C 154(b) by 0 days. --

Signed and Sealed this

First Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,375,920 B2  Page 1 of 6
APPLICATION NO. : 09/284247
DATED : April 23, 2002
INVENTOR(S) : Fischer et al.

It is certified that error appears in the above-identified patent and that said Letters Patent is hereby corrected as shown below:

Please Delete *Columns 1 Line 1* through *Columns 9 Line 12* and Insert *Columns 1 Line 1* through *Columns 10 Line 16* as attached.

Signed and Sealed this

Third Day of March, 2009

JOHN DOLL
*Acting Director of the United States Patent and Trademark Office*

PROCESS FOR THE MANUFACTURE OF HYDROGEN PEROXIDE

BACKGROUND OF THE INVENTION

1. Field of the Invention

The present invention relates to a process for preparing a hydrogen peroxide solution having a hydrogen peroxide content of not less than 2.5% by weight by continuous reaction of hydrogen and oxygen over a catalyst comprising palladium as active component.

2. Description of the Background

Customary industrial processes for preparing hydrogen peroxide are the electrolysis of acidic ammonium sulfate solutions, the oxidation of isopropyl alcohol and the anthraquinone process. The direct synthesis of hydrogen peroxide from the elements over transition metal catalysts is known, but has not found commercial use to date.

There are several reasons for this. For instance, hydrogen and oxygen form explosive gas mixtures if the level of hydrogen in the gas mixture is above 5% by volume. On the other hand, the rate of formation of hydrogen peroxide on using hydrogen-oxygen mixtures outside the explosive range is generally too low to ensure reasonable space-time yields. In addition, an excessively high level of oxygen in the reaction gas can speed up the oxidative degradation of the catalysts.

The selectivity of the reaction is a further problem. For instance, the reaction to form the hydrogen peroxide has to compete with that to form water. In addition, the catalysts which are suitable for forming hydrogen peroxide from the elements also catalyze the degradation reaction of hydrogen peroxide in the presence of excess hydrogen in accordance with the following reaction equation: $H_2O_2 + H_2 \rightarrow 2H_2O$. This selectivity problem can be solved by using continuous processes at high flow rates. However, this has the consequence that, at a low reaction rate, the hydrogen peroxide concentrations obtained in the effluent become too low for commercial use of this process. In addition, excessively high flow rates give rise to catalyst abrasion problems, leading to reduced on-stream times and hence likewise to commercial disadvantages for this process.

U.S. Pat. No. 4,009,252 discloses an optimum ratio of $O_2$ to $H_2$ within the range from 1.5:1 to 20:1, i.e. in the explosive range, for the formation of hydrogen peroxide from hydrogen and oxygen over palladium catalysts. The reaction is carried out as a batch process and the space-time yields which are obtained are unsatisfactory.

WO 92/04277 describes the reaction of hydrogen with oxygen in a tubular reactor packed with an aqueous suspension of catalyst. The gas mixtures used are preferably located within the explosive range. A high flow rate of the reaction medium (>1 m/sec) is used to ensure that the reaction gas is completely dispersed in the reaction medium in the form of small bubbles, preventing an explosive reaction of the reaction gas. The hydrogen peroxide concentrations obtained after a single pass through the reaction zone are below 1% by weight. Higher yields can only be obtained by repeated passes through the reaction zone. The fact that the catalyst is used in the form of a suspension turns out to be a problem because this necessitates elaborate filtration and recycling measures, with inevitable losses of the catalyst. Reaction tubes which are suitable for the required reaction pressure—pressures of above 80 bar are disclosed in the illustrative embodiments—are comparatively costly. The cited process must therefore be considered very costly. A similar process with improved fluidization of the hydrogen and oxygen streams is described in WO 96/05138.

U.S. Pat. No. 5,500,202 and EP-A 579 109 describe a continuous process for preparing hydrogen peroxide by reacting $H_2/O_2$ gas mixtures over a stationary pulverulent catalyst (particle sizes within the range 10 µm to 250 µm) in a trickle bed reactor. To reduce the risk of explosion due to the large gas volume which is customary for a trickle bed reactor, nitrogen is added as an inert gas to the reaction gas. However, this entails additional costs. The aqueous hydrogen peroxide solutions obtained in this way only have concentrations within the range from 3 to 5%. The conversion based on hydrogen is merely within the range of 25-35%. No data are provided about catalyst life. Reactors having a maximum internal diameter of 30 mm are recommended because of the considerable heat production. Industrial use would therefore require the installation of several thousands of these tubular reactors, which entails high capital expenditure costs.

U.S. Pat. No. 4,336,238 and U.S. Pat. No. 4,336,239 describe the reaction of hydrogen and oxygen to form hydrogen peroxide over palladium catalysts in organic solvents or solvent mixtures in the presence or absence of water. The process described makes it possible to reduce the proportion of hydrogen in the reaction gas, but the hydrogen peroxide concentrations of more than 2.4% by weight which are obtained on using reaction gas mixtures comprising less than 5% by volume of hydrogen are too low for commercial application. The use of organic solvents has an advantageous effect on catalyst life. However, over a run of 285 hours catalyst activity decreases to 69% of the original value, which is still too low for industrial application. U.S. Pat. No. 4,389,390 describes a similar process in which the catalyst which has become detached from the support is recovered by activated carbon filters. A further advantage of this process is that removal of the catalyst from the reaction medium reduces the tendency of the hydrogen peroxide to decompose. However, no hydrogen peroxide solutions having a concentration of above 2.1% by weight are obtained in continuous operation.

The literature proposes various solutions for the problem of catalyst deactivation in the preparation of hydrogen peroxide from the elements. For instance, U.S. Pat. No. 5,352,645 and WO 92/04976 describe special solid supports composed of spray-dried, colloidal silica gel. The use of superacidic oxides as support materials is proposed in U.S. Pat. No. 5,236,692 and EP-A 437 836. This avoids the customary acid content in the reaction medium. EP-A 627 381 teaches the use of niobium, tantalum, molybdenum or tungsten oxides as support materials which are characterized by high acid resistance. U.S. Pat. No. 5,292,496 describes the use of cerium-comprising support materials to avoid the use of halogen as a stabilizer in the reaction medium. However, in the references cited, hydrogen peroxide is always prepared by batch or semicontinuous processes which have little to recommend them for industrial use. In addition, the short reaction times do not provide any information about catalyst life.

The use of catalyst monoliths comprising palladium as active component is described by Kosak in Catalysis of Organic Reactions (eds. Scaros and Prunier), Marcel Dekker Inc., New York 1995, p. 115 et seq., for the preparation of hydrogen peroxide from the elements. The reaction is carried out batchwise in an aqueous reaction medium at a comparatively high pressure of 144 bar and a molar ratio of $O_2:H_2=4.7$, i.e. in the explosive range.

It is an object of the present invention to provide a process for preparing hydrogen peroxide from hydrogen and oxygen to prepare hydrogen peroxide solutions having a hydrogen peroxide content of above 2.5% by weight even from hydrogen-oxygen mixtures outside the explosive range ($O_2$:$H_2$>20:1). The catalysts used shall have long on-stream times.

We have found that this object is achieved by a continuous process comprising the reaction of hydrogen and oxygen in water and/or $C_1$-$C_3$-alkanols as reaction medium over catalytic structures comprising palladium as active component.

The present invention accordingly provides a process for preparing a hydrogen peroxide solution having a hydrogen peroxide content of not less than 2.5% by weight by continuous reaction of hydrogen and oxygen over a catalyst comprising palladium as active component, which comprises performing the reaction in water and/or a $C_1$-$C_3$-alkanol as reaction medium over a catalytic structure.

Catalytic structures are catalysts in which the catalytically active component is situated on the surface of specifically shaped supports. Such supports can be customary packing elements, such as Raschig rings, saddles, Pall® rings, wire spirals or wire mesh rings, constructed from various materials suitable for coating with the active component (see also Römpp-Chemie-Lexikon, 9th edition, p. 1453 et seq.). The packing elements provided with the catalytically active component are dumped into the reactor. Preferred structures have channels with hydraulic radii (definition see VDI-W ärmeatlas, section LE1) within the range from 1 to 10 mm.

Preference is given to catalytic structures which are installed in the reactor in the form of arranged packings and which have a large surface area relative to the volume due to a multiplicity of flow-through channels. Such structures will hereinafter be referred to as catalyst monoliths. Suitable reactors are described for example in EP-A 068 862, EP-A 201 614 and EP-A 448 884.

The catalyst monoliths or, to be more precise, the monolithic supports are generally constructed from wovens, knits, foils, expanded metals and/or sheets. Monolithic supports can also be prepared by extrusion as described in U.S. Pat. No. 4,364,888 and U.S. Pat. No. 4,333,896. Suitable monolithic supports include structures constructed from open-celled foams. These foams can be for example ceramic, melamine resin or polyurethane foams.

Preference is given to catalyst monoliths constructed from wovens, since they are particularly well permeated by the liquid reaction medium in the reactor and thus permit high conversion rates.

Suitable wovens are constructed for example from fibers of oxidic materials, such as $Al_2O_3$ and/or $SiO_2$, or from polymeric fibers, for example polyamide, polyester, polyvinyl chloride, polyethylene, polypropylene, polytetrafluoroethylene fibers, or carbon fibers. Preference is given to woven catalyst supports constructed from weavable metal wires, for example composed of iron, spring steel, hastelloy, monel, silver, chrome steel, chrome nickel steel or titanium. Very particular preference is given to woven catalyst supports constructed from weavable wires of highly alloyed stainless steels or metals which protect against further corrosion through formation of a passivating layer, for example Cr steels, CrNi steels, CrNiTi steels and CrNiMo steels or heat-resistant steels having the material numbers 1.4016, 1.4767, 1.4401, 2.4610, 1.4765, 1.4847, 1.4301, 1.4742.

The wires and fibers mentioned can be used to produce wovens in different constructions, such as flat constructions, twill constructions, galloon constructions, five-shaft satin constructions and other specialty constructions. These wovens are preferably joined together to form multilayered assemblies. Suitable woven monolithic catalyst supports are described in EP-A 498 435.

Particularly suitable catalyst monoliths are constructed from a plurality of layers of corrugated, folded and/or flat wovens arranged in such a way that adjacent layers form more or less closed channels. The hydraulic diameter of the channels is preferably within the range from 1 to 10 mm, in particular from 1.5 to 3 mm (as per definition in VDI-W ärmeatlas, section LE1). These channels can be straight or curved. Preference is given to multilayered wovens in which flat and corrugated or folded wovens alternate. Monoliths in which the wovens are partly or wholly replaced by metal sheets, knits or expanded metals, can likewise be used. Such monoliths are preferably installed in the reactor in such a way that the channels are inclined away from the flow direction of the reaction medium. The woven layers themselves are preferably installed in the reactor parallel to the direction of flow. If a plurality of these units are to be arranged in series, they are preferably installed in such a way that the flow channels are alternatingly inclined in opposite directions away from the flow direction. The units are preferably installed in such a way that the woven layers of two successive units form an angle of preferably about 90° to each other. Wound moduli of corrugated or folded and optionally also planar woven layers are likewise suitable.

The coating of the catalyst supports with the catalytically active component is effected according to customary coating methods (see below). In the case of monolithic supports constructed from wovens, foils, sheets, knits or expanded metals, coating generaly takes place prior to further processing to the catalyst monolith. However, it can also take place on the preformed support. If the wovens are to be clamped in use frames and then optionally joined together to form catalyst cells, it is advisable to coat the wovens in the unprocessed state.

The catalytically active component, as well as palladium as main substituent, may comprise further metals, preferably noble metals especially platinum, rhodium, iridium, copper, silver and/or gold as promoters. The ratio of palladium/promoter metal is preferably within the range from 100:1 to 1:10 and in particular within the range from 10:1 to 1:1. The palladium and the optional promoter metals generally account for from $5 \times 10^{-4}$ to 1% by weight and in particular from $10^{-3}$ to 0.15% by weight, based on the total catalyst mass (support+active component).

In the case of catalyst supports having a porous surface, as is the case, for example, with catalyst supports having surfaces of active aluminum oxide or $SiO_2$, the active component is generally applied by an impregnating or saturating step, which is generally followed by a drying and activating step. Such techniques are described for example in DE-A 22 56 195 or in DE-A 23 17 560, incorporated herein in full by reference. Also suitable are catalysts in which an active aluminum oxide layer and then a coating of palladium is applied to a metal support. The oxide layer is prepared by dipping the support into a dispersion of active aluminum oxide and then heat-treating at elevated temperature. The noble metal is then applied on top of this oxide layer by saturating with a palladium salt solution, and activated after drying by reduction with hydrogen at 500° C. This process is disclosed in EP-A 075 124, likewise incorporated herein in full by reference. DE-A 41 13 525 describes a process for coating surfaces in complex geometrical structures with noble metals by, in a first step, wetting the structures with a solution comprising the complexes of the metals with organic ligands and then destroying these complexes by UV irradiation. In this way it is possible to provide nets, webs, fibers and bodies having a honeycomb, spongey or porous structure with stable noble metal coatings, irrespectively of the chemical constitution of the surface. This coat in process is likewise suitable for preparing the catalyst monoliths of the invention. Coatings suitable for the purposes of the invention can be obtained in the manner described in EP-A 374 099 by saturating the catalyst support with suitable palladium(0) complexes and subsequent thermolysis of these complexes. Reetz et al. (Angew. Chem. 1995, 107, 2956-2958) describe the coating of $SiO_2$ or $Al_2O_3$ surfaces with preformed palladium clusters. This produces, even in the case of porous surfaces, very thin layers of the active component (eggshell catalysts). This method too can be used to prepare catalyst monoliths suitable for the purposes of the present invention. The application of metals upon thermally stable catalyst supports can also be effected by the process of flame-spraying (see P. Fauchais et al. in Pure and Appl. Chem., Vol. 66, (1994), 1247-1258). The catalytically active component can also be applied by vacuum vapor deposition of metals upon the catalyst support. Suitable vacuum vapor deposition techniques include in particular therml vapor deposition, flash vapor deposition, cathode atomization and also sputtering. Thermal vapor deposition can be carried out by direct or indirect electrical heating. Electron beam vapor deposition is preferably employed for this method. The woven catalyst supports of the invention can be coated continuously or batchwise according to these processes. Reference is made to EP-A 198 435 for further details. The process described in DE-A 41 21 418 for applying Pd or Pt alloys to metal surfaces is likewise suitable for preparing the catalysts of the invention.

Palladium and optionally the promoters are preferably applied to the catalyst support by electrolytic, especially by electrochemical, deposition from corresponding metal salt solutions. Suitable reducing agents are in particular hydrazine, citric acid, ethanol, salts of hypophosphorous acid, e.g. $NaH_2PO_2$, formaldehyde, formic acid, boranates such as sodium borohydride, or stabilized borane solutions such as, for example, complexes of borane with diethyl ether, dimethylamine or diethylamine (see also A. Laus in Mater. Sci.Eng. A 146 (1991) 33,49; see also Dechema-Tagungsbericht XXIX. Jahrestreffen deutscher Katalytiker, Friedrichroda, März 1996, p. 66).

Here it is advisable to pretreat the catalyst support to improve the adhesion of the active component to the support's surface. This includes for example removing greases or similar substances which impair the desired surface adhesion, for example by rinsing with organic solvents such as ether, acetone or halogenated hydrocarbons, or calcining. Oxide layers on metallic supports can also be removed by treatment with mineral acids, for example hydrochloric acid or sulfuric acid. The resulting graining of the metallic surface improves the cementing of the active component, especially in the case of electrolytic or electrochemical deposition.

The catalyst systems of support and active component/promoter resulting from the processes described can then be activated by thermal treatment at from 200 to 900° C., preferably 400 to 700° C. This thermal aftertreatment can take place in an oxidizing, inert or reducing atmosphere. Especially in the case of polymetallic systems, activation in a reducing atmosphere is preferred, since alloys are formed more readily.

The finished catalyst systems are then fitted in the reaction space (see above). Particular preference is given to tubular reactors equipped with cylindrical catalyst units, since a uniform flow regime is able to form here, which allows particularly good reaction control.

The reaction is generally carried out with a flooded reactor. The reaction medium used is water and/or $C_1$-$C_3$-alkanols, preferably water and/or methanol. If the reaction medium used is water, up to 20% by weight of the alcohol, preferably methanol, can be added to it. If an alcoholic reaction medium is used, it can include up to 40% by weight, preferably up to 20% by weight, particularly preferably up to 5% by weight, of water. Very particular preference is given to water as sole reaction medium. To stabilize the hydrogen peroxide against decomposition, the reaction medium is admixed with acids whose pKa value is preferably less than that of acetic acid, especially mineral acids such as sulfuric acid, phosphoric acid or hydrochloric acid. The acid concentration is generally not less than $10^{-4}$ mol/liter, preferably within the range from $10^{-3}$ to $10^{-1}$ mol/liter. In addition, in general, traces of bromide or chloride are added in concentrations of from 1 to 1000 ppm, preferably 5 to 300 ppm. However, it is also possible to use other stabilizers, for example formaldehyde.

The reaction gas, which, as well as hydrogen and oxygen, may further comprise inert gases such as nitrogen or noble gases, generally has $O_2$:$H_2$ ratios within the range from 2:1 to 1000:1. Preference is given to molar ratios within the range 5:1 to 100:1, particularly preferably within the range from 20:1 to 50:1. The oxygen used in the reaction gas can also be included in the reaction gas in the form of air.

In a preferred embodiment, the reaction gas is recycled. In this case, the molar ratio in the fresh gas mixture is in the vicinity of the stoichiometry of the reaction, preferably within the range from 1.5:1 to 0.5:1. The molar ratio of $O_2$:$H_2$ in the recycle gas should be within the range from 5:1 to 1000:1, preferably within the range from 20:1 to 100:1. The reaction can be carried out at atmospheric pressure and also at superatmospheric pressures of up to 200 bar. The pressure is preferably within the range from 10 to 100 bar, especially within the range from 10 to 80 bar. The reaction temperature can be within the range from 0 to 60° C., preferably within the range from 20 to 50° C. The partial pressures of the reaction gases in the reaction gas mixture in the reactor and also in the recycle gas are preferably chosen so that, under reaction conditions, the hydrogen concentration is below the lower explosion limit.

Reaction gas and reaction medium can move cocurrently or countercurrently to each other, preferably cocurrently, in which case the liquid phase forms the continuous phase and the reaction gas the discontinuous phase. In the case of the preferred vertical reactor design (upright reactor), reaction gas and reaction medium are preferably passed in cocurrent upwardly through the reactor. Here, hydrogen can be fed into the reactor via one or more intermediate feed points downstream of the feed point for the oxygen or air feed point. The superficial velocity of reaction gas and reaction medium is within the range from 50 to 1000 m/h, preferably within the range from 150 to 300 m/h.

The disclosed process makes it possible to produce hydrogen peroxide solutions having hydrogen peroxide contents above 2.5% by weight, preferably within the range from 5 to 25% by weight. The concentration can be preselected as desired by adjusting the mass flows. The selectivity of hydrogen peroxide formation is always above 65%, preferably 75%. Long-term studies have shown that catalyst activity and selectivity decrease little, if at all, in the course of a 40-day run.

FIG. 1 shows by way of example a reactor system featuring an upright reactor 1, which has hydrogen feed points 2 arranged intermediate of a plurality of layers 3 of woven catalyst monolith. A pump 4 supplies methanol and/or water. A connection line 5 supplies oxygen and a gas-liquid disperser, for example a mixing jet 6, disperses it in the form of bubbles in a circulating liquid 7. The same mixing jet 6—or a separate mixing jet, if desired—supplies a stream 8 of hydrogen. Further quantities 2 of hydrogen are supplied under quantity control via dispersing means 9 at the intermediate feed points 10 between the catalyst layers 3. At the upper end of the reactor, a two-phase reactor effluent 11 is removed and separated in a separating vessel 12. The gas phase is reintroduced at the lower end of the reactor via the mixing jet 6 after passing through a compressor 13 or, if the reactor is not very tall, preferably directly. A stream 14 of the gas is fed via a pressure container 15 into the off-gas line 16 to limit the build-up of inerts. The liquid is cooled with cooling water in a heat exchanger 17 and reintroduced via a pump 18, at the lower end of the reactor. In addition, it is also possible to provide intermediate removal points 19 for the two-phase reactor contents along the reactor, to carry out a phase separation 20 and to reintroduce the two phases—the liquid phase cooled—at a lower point 21 of the reactor. The liquid reaction product 22 is removed from the phase separator 12 at the upper end of the reactor as stream 23.

The Examples which follow illustrate the present invention.

I. Preparation of Catalyst Shapes Using Supports Composed of V4A Fabric

A corrugated net and a flat net composed of V4A steel (1.4571, mesh size 180 μm, wire diameter 146 μm) were placed on top of each other and rolled to form a cylindrical monolith 5 cm in height and 5 cm in diameter. The ends of the nets were fixed by spot welding. The net plane spacing of the flat nets was not less than 1 mm.

The monolithic support was treated in succession with acetone and distilled water and then dried. Thereafter the monolith was treated with a solution of 25% by weight of concentrated hydrochloric acid and 75% by weight of distilled water at 60° C. for 30 minutes and rinsed off with distilled water. The monolith thus treated was introduced into 150 ml of distilled water. After the addition of 10 drops of concentrated $HNO_3$ and 36 ml of a 1% strength by weight aqueous solution of hypophosphorous acid, 20 ml of a palladium nitrate solution having a palladium concentration of 1% by weight were added. This was followed by heating to 60° C. for 17 minutes and then to 80° C. for one hour. This was followed by cooling, and the catalyst monolith was washed with distilled water and dried at 120° C. for 16 hours.

II. Preparation of Hydrogen Peroxide

The reaction vessel used is a 270 ml autoclave equipped with stirrer, thermostating and 50 bar pressure maintenance. In this autoclave, the catalyst monolith prepared in I was installed centrally around the stirrer axis, so that it is uniformly supplied with liquid and gas by the stirrer. The reactor bottom is equipped with feed lines for oxygen, hydrogen and the reaction medium. The reactor lid is equipped with a take-off line from which the product/gas mixture is continuously removed. After deduction of the volumes for all internals, the effective reaction volume available was 208 ml.

EXAMPLE 1

The reaction medium consisted of methanol admixed with 0.4% by weight of sulfuric acid, 0.1% by weight of phosphoric acid and 6 ppm of bromide (in the form of sodium bromide). The reactor was flooded with the reaction medium. A stream of 72.8 g/h of reaction medium, 48.6 l/h of oxygen and 5.5 l/h of hydrogen (gases based on standard conditions) was then passed through the reactor. The product/gas mixture was continuously removed at the reactor lid.

The conversion based on hydrogen was 76% (as per determination of the hydrogen content of the off-gas) coupled with a selectivity of 82%. The concentration of the resulting methanolic hydrogen peroxide solution was 7% by weight (titration with 0.1 N $KMnO_4$).

EXAMPLE 2

Example 1 was run for 100 hours. In total, 2.9 kg of hydrogen peroxide were obtained in the form of a methanolic solution having a concentration of 4% by weight.

EXAMPLE 3

A catalyst monolith was prepared from V4A net with a palladium coating similarly to I. This shape was then hydrogenated with hydrogen at 70° C. and 50 bar, treated with methanolic $H_2O_2$ solution at 20° C. and dried with nitrogen. The catalyst shape was then installed in the autoclave of II. The reaction was carried out similarly to Example 1: The flow rate through the reactor at 42.2° C. was 214.5 g/h for the reaction medium, 145.8 l/h for oxygen and 16.2 l/h for hydrogen. The conversion based on $H_2$ was 84% coupled with a selectivity of 75%. The concentration of the methanolic hydrogen peroxide solution was 7% by weight.

EXAMPLE 4

The same catalyst as in Example 3 was used. The reaction parameters were as follows: 214.5 g/h of reaction medium, 145.8 l/h of oxygen, 6.1 l of hydrogen, T=52° C. The conversion based on $H_2$ was 90%, coupled with a selectivity of 68%. The concentration of the resulting hydrogen peroxide solution was 2.7% by weight.

EXAMPLE 5

The same catalyst as in Example 3 was used. The reaction medium was water admixed with 0.4% by weight of sulfuric acid, 0.1% by weight of phosphoric acid and 6 ppm of bromide (in the form of sodium bromide). The reaction parameters were as follows: 268.0 g/h of reaction medium, 291.6 l/h of oxygen, 32.4 l/h of hydrogen, T=42° C. The conversion based on hydrogen was obtained by determining the hydrogen in the off-gas and was found to be 43% coupled with a selectivity of 70%. The concentration of the resulting hydrogen peroxide solution was 5.6% by weight.

We claim:

1. A process for preparing a hydrogen peroxide solution comprising reacting in a reactor, hydrogen and oxygen in a reaction medium containing water, a $C_1$-$C_3$ alkanol, or mixture thereof concurrently over a catalyst comprising palladium wherein the hydrogen peroxide solution obtained comprises not less than 2.5% by weight of hydrogen peroxide, and wherein the catalyst is a catalytic structure in the form of an ordered packing material which is installed in the reactor, and wherein the catalytically active component of said catalyst is situated on the surface of a support, wherein said support is selected from the group consisting of Raschig rings, saddles, Pall rings, wire spirals, wire mesh rings and monolithic supports; wherein the superficial velocity of reaction gas and reaction medium is within the range from 50 to 1,000 m/h, and wherein the partial pressures of the reaction gases are chosen under the reaction conditions where the hydrogen concentration is below the lower explosion limit.

2. The process as claimed in claim 1, wherein hydrogen and oxygen are reacted in a molar ratio $O_2:H_2$ from 20:1 to 50:1.

3. The process of claim 1, wherein the catalytic structure is constructed from a woven material.

4. The process of claim 3, wherein the woven is a metallic woven material.

5. The process of claim 1, wherein the active component includes not only palladium but also a further noble metal as promoter.

6. The process of claim 5, wherein the molar ratio of palladium to promoter metal is within the range from 100:1 to 1:10.

7. The process of claim 5, wherein the promoter is selected from the group consisting of platinum, rhodium, iridium, copper, silver and gold.

8. The process of claim 1, wherein the oxygen is used in the form of air.

9. The process of claim 1, wherein the molar ratio of $O_2:H_2$ in the off-gas is above 20:1.

10. The process of claim 1, wherein the reaction gas is recycled.

11. The process of claim 10, wherein the molar ratio of $O_2:H_2$ in the recycle gas is within the range from 20:1 to 100:1.

12. The process of claim 1, wherein the reaction is carried out at a temperature within the range from 0° C. to 80° C.

13. The process of claim 1, wherein the reaction is carried out at a pressure within the range from 10 to 100 bar.

14. The process of claim 1, wherein the reaction medium comprises water, methanol or a methanol-water mixture.

15. The process of claim 1, wherein the reaction medium further comprises an acid having a $pK_a$ below that of acetic acid.

* * * * *